United States Patent
Chen et al.

(10) Patent No.: US 9,134,124 B2
(45) Date of Patent: Sep. 15, 2015

(54) SYSTEM AND METHOD FOR ESTIMATION OF MACHINE POSITION

(71) Applicant: Caterpillar Inc., Peoria, IL (US)

(72) Inventors: Qi Chen, Dunlap, IL (US); Andrew Whitten, Dunlap, IL (US); Paul R. Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 14/177,565

(22) Filed: Feb. 11, 2014

(65) Prior Publication Data

US 2015/0226550 A1 Aug. 13, 2015

(51) Int. Cl.
*G01M 17/00* (2006.01)
*G01B 21/16* (2006.01)
*G01C 21/16* (2006.01)

(52) U.S. Cl.
CPC ............. *G01B 21/16* (2013.01); *G01C 21/16* (2013.01)

(58) Field of Classification Search
CPC ............................... G01B 21/16; G01C 21/16
USPC .......................................................... 701/30.3
See application file for complete search history.

(56) References Cited

U.S. PATENT DOCUMENTS

| | | |
|---|---|---|
| 5,184,304 A | 2/1993 | Huddle |
| 8,290,744 B2 | 10/2012 | Brady et al. |
| 2005/0195109 A1* | 9/2005 | Davi et al. ................... 342/463 |
| 2005/0261004 A1* | 11/2005 | Dietrich et al. ............ 455/456.2 |
| 2008/0080441 A1* | 4/2008 | Park et al. ..................... 370/338 |
| 2008/0234930 A1* | 9/2008 | Cheok et al. .................. 701/207 |
| 2011/0257927 A1 | 10/2011 | Bharadwaj et al. |
| 2013/0160543 A1 | 6/2013 | Kontz et al. |

* cited by examiner

*Primary Examiner* — Hussein A. Elchanti

(57) ABSTRACT

A system is provided. The system includes a perception sensor, a first inertial measurement unit and a first localization module. The first localization module is configured to generate a first position estimate signal indicative of an estimated position of the machine. The system includes a second inertial measurement unit and a second localization module. The second localization module is configured to generate a second position estimate signal indicative of the estimated position of the machine. A position determination module is communicably coupled to the first and second localization modules. The position determination module is configured to determine a health of the first and second localization modules based on one or more parameters indicative of errors associated with the first and second inertial measurement units respectively; and determine an estimated position of the machine based on the determined health of the first and second localization modules.

20 Claims, 3 Drawing Sheets

SYSTEM AND METHOD FOR ESTIMATION OF MACHINE POSITION

TECHNICAL FIELD

The present disclosure relates to position detection system for a machine, and more specifically to a perception based location detection system for the machine.

BACKGROUND

Machines operating on a worksite may make use of a global positioning system (GPS) for determining a position of the machine on the worksite. However, some operating environment conditions are such that the GPS services may be denied thereon due to a variety of factors, such as, network coverage issues. Perception based location (PBL) systems are employed on such machines in order to provide location information of the machine operating in such GPS denied environments. The PBL system makes use of an inertial measurement unit, one or more perception sensors, position estimation filters and so on for determining the position of the machine on the worksite.

U.S. Pat. No. 8,290,744 discloses a system for providing fault-tolerant inertial measurement data including a sensor for measuring an inertial parameter and a processor. The sensor has less accuracy than a typical inertial measurement unit (IMU). The processor detects whether a difference exists between a first data stream received from a first inertial measurement unit and a second data stream received from a second inertial measurement unit. Upon detecting a difference, the processor determines whether at least one of the first or second inertial measurement units has failed by comparing each of the first and second data streams to the inertial parameter.

SUMMARY OF THE DISCLOSURE

In one aspect of the present disclosure, a system is provided. The system includes a perception sensor configured to generate a signal indicative of scene data associated with an environment in a vicinity of operation of a machine. The system also includes a first inertial measurement unit configured to generate a first signal indicative of a change in position of the machine. The system also includes a first localization module communicably coupled to the perception sensor and the first inertial measurement unit. The first localization module is configured to generate a first position estimate signal indicative of an estimated position of the machine. Further, the system includes a second inertial measurement unit configured to generate a second signal indicative of the change in position of the machine. The system also includes a second localization module communicably coupled to the perception sensor and the second inertial measurement unit. The second localization module is configured to generate a second position estimate signal indicative of the estimated position of the machine. A position determination module is communicably coupled to the first localization module and the second localization module. The position determination module is configured to determine a health of the first localization module and the second localization module based on one or more parameters indicative of errors associated with the first and second inertial measurement units respectively. Also, the position determination module is configured to determine an estimated position of the machine based on the determined health of the first localization module and the second localization module.

In another aspect of the present disclosure, a method is provided. The method includes generating a signal indicative of scene data associated with an environment in a vicinity of operation of a machine. The method also includes generating a first signal indicative of a change in position of the machine. The method includes generating a first position estimate signal indicative of an estimated position of the machine. The method includes generating a second signal indicative of the change in position of the machine. The method includes generating a second position estimate signal indicative of the estimated position of the machine. The method includes determining a health of a first localization module and a second localization module based on one or more parameters indicative of errors associated with a first and a second inertial measurement unit respectively. The method also includes determining an estimated position of the machine based on the determined health of the first localization module and the second localization module.

In yet another aspect of the present disclosure, a machine operating on a worksite is disclosed. The machine includes a power source. The machine also includes a frame. The machine further includes a perception sensor. The perception sensor is configured to generate a signal indicative of scene data associated with an environment in a vicinity of operation of the machine. The machine includes a first inertial measurement unit configured to generate a first signal indicative of a change in position of the machine. Further, a first localization module is communicably coupled to the perception sensor and the first inertial measurement unit. The first localization module is configured to generate a first position estimate signal indicative of an estimated position of the machine. The machine also includes a second inertial measurement unit. The second inertial measurement unit is configured to generate a second signal indicative of the change in position of the machine. A second localization module is communicably coupled to the perception sensor and the second inertial measurement unit. The second localization module is configured to generate a second position estimate signal indicative of the estimated position of the machine. The machine also includes a position determination module. The position determination module is communicably coupled to the first localization module and the second localization module. The position determination module is configured to determine a health of the first localization module and the second localization module based on one or more parameters indicative of errors associated with the first and second inertial measurement units respectively. The position determination module is also configured to determine an estimated position of the machine based on the determined health of the first localization module and the second localization module.

Other features and aspects of this disclosure will be apparent from the following description and the accompanying drawings.

DETAILED DESCRIPTION

Figure 1:
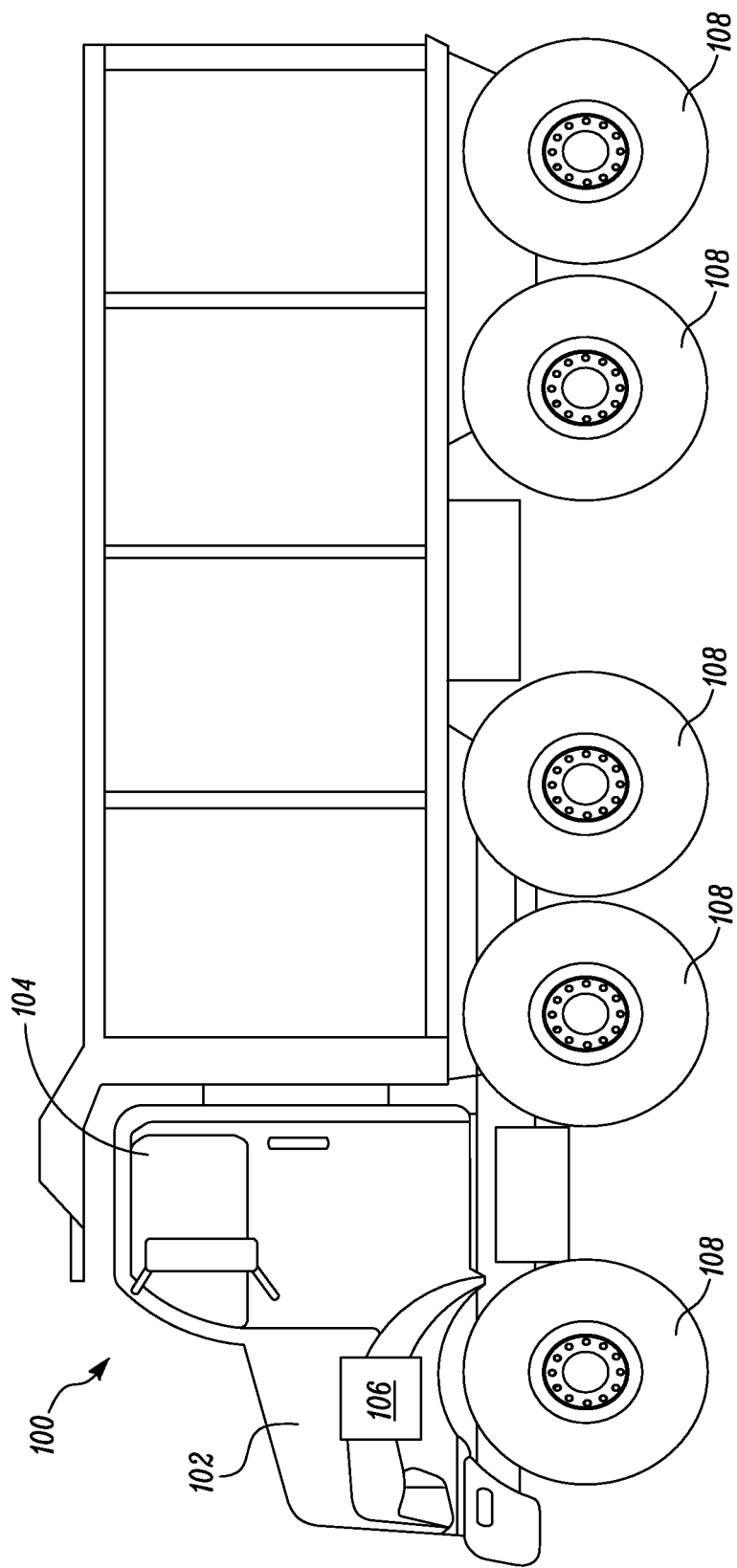
FIG. 1 is a diagrammatic view of an exemplary machine, according to one embodiment of the present disclosure.

Wherever possible the same reference numbers will be used throughout the drawings to refer to the same or the like parts. FIG. 1 illustrates an exemplary machine 100, according to one embodiment of the present disclosure. The machine 100 shown in the accompanying figures is a truck. Alternatively, the machine 100 may include any other machine such as, a dozer, a loader, a backhoe, an excavator, a motor grader, a wheel tractor scraper and the like. The machine 100 may be configured to perform some type of operation associated with an industry such as mining, construction, farming, transportation, power generation, or any other industry known in the art. The machine 100 may either be an autonomous or a manned machine.

The machine 100 may generally include a frame 102 that at least partially defines or supports an operator station 104, one or more engines 106 mounted to the frame 102, and a plurality of traction devices 108 driven by the engine 106 to propel the machine 100. The traction devices 108, in the disclosed exemplary embodiments, are wheels located at opposing sides of the machine 100. Each traction device 108 may be independently driven to turn the machine 100 or simultaneously and dependently driven to propel the machine 100 in a straight direction. It is contemplated that one or all of the traction devices 108 may be replaced with another type of traction device, such as, belts or tracks. The machine 100 further includes a system 200 for estimating a position of the machine 100 on a worksite.

Figure 2:
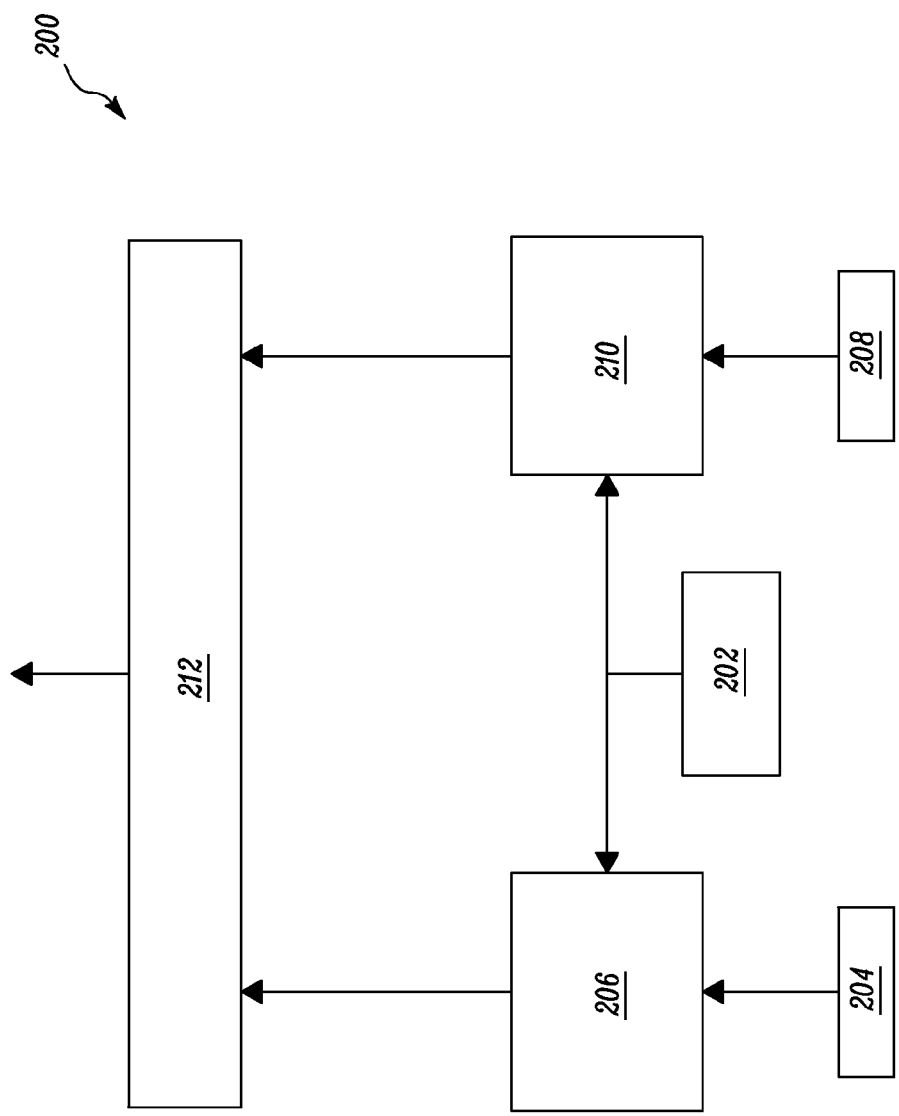
FIG. 2 is a block diagram of an exemplary system for estimation of a position of the machine.

FIG. 2 illustrates a block diagram of the system 200 for estimating the position of the machine 100 on the worksite. The system 200 includes at least one perception sensor 202 configured to generate a signal indicative of scene data associated with a worksite on which the machine 100 operates. This scene data may include information related to an environment surrounding the machine 100 or in a vicinity of operation of the machine 100. The information may include geospatial information, object detection and other such data related to the worksite.

The perception sensor 202 may embody a device configured to detect and range objects located at a predetermined distance from or at a predetermined angular range around the 360 degrees around the machine 100. In some embodiments, the scene data may be limited to the front side (180 degrees or less) of the machine 100. In other embodiments, the perception sensor 202 may generate the scene data for objects located 360 degrees around the machine 100. For example, the perception sensor 202 may be embodied by a light detection and ranging (LIDAR) device, a radio detection and ranging (RADAR) device, a sound navigation and ranging (SONAR) device, and an image capturing device or another device known in the art.

In one example, the perception sensor 202 may include an emitter and a receiver. The emitter is configured to emit a detection beam and the associated receiver is configured to receive a reflection of the detection beam. Based on characteristics of the reflected detection beam, a distance and a direction from an actual sensing location of the perception sensor 202 on the machine 100 to a portion of a sensed physical object may be determined. By utilizing beams in a plurality of directions, the perception sensor 202 may generate the scene data of the surroundings of the machine 100. For example, if the perception sensor 202 is embodied by a LIDAR device or another device using multiple laser beams, the perception sensor 202 may generate a cloud of points as the scene data describing the environment in the vicinity of the machine 100.

The system 200 includes a first inertial measurement unit 204 (hereinafter referred to as first IMU 204) communicably coupled to a first localization module 206. The system 200 also includes a second inertial measurement unit 208 (hereinafter referred to as second IMU 208) communicably coupled to a second localization module 210. Further, the perception sensor 202 is communicably coupled to the first and second localization modules 206, 210.

The first IMU 204 is configured to generate a first signal indicative of a change in position of the machine 100. Similarly, the second IMU 208 is configured to generate a second signal indicative of the change in position of the machine 100. The change in position of the machine 100 may be computed or derived from angular rates and acceleration of the machine 100. For example, the first and/or second IMUs 204, 208 may include a 6-degree of freedom (6 DOF) IMU. A 6 DOF IMU consists of a 3-axis accelerometer, 3-axis angular rate gyros, and may optionally include a 2-axis inclinometer. The 3-axis angular rate gyros may provide signals indicative of the pitch rate, yaw rate, and roll rate of the machine 100. The 3-axis accelerometer may provide signals indicative of the acceleration of the machine 100 in the x, y, and z directions.

The first localization module 206 is configured to receive the first signal from the first IMU 204. Further, based on an input signal received from the perception sensor 202, the first localization module 206 is configured to generate a first position estimate signal indicative of an estimated position of the machine 100 on the worksite. Similarly, the second localization module 210 is configured to receive the second signal from the second IMU 208 and the signal from the perception sensor 202 and further generate a second position estimate signal indicative of the estimated position of the machine 100 based on the received signals.

It should be noted that the first and second localization modules 206, 210 may employ one or more position estimation programs or subprograms and receive inputs from one or more sensors associated with the machine 100. These sensors may include the perception sensor 202, the first and second IMUs 204, 208 and other sensors present onboard the machine 100, for example, an odometer, a locating device and the like. One of ordinary skill in the art will appreciate that the first and second localization modules 206, 210 may determine the estimated position of the machine 100 using techniques known in the art. For example, a Kalman filter, a Perception Based Localization (PBL) filter, or any other known mathematical method or model may be utilized to predict the estimated position of the machine 100 based on readings taken over a period of time.

The first and second localization modules 206, 210 may generate error signals respectively indicative of an error or a degree of uncertainty associated with the estimated positions of the first and second estimated positions respectively. The error or the degree of uncertainty may indicate a threshold range associated with the estimated position within which the machine 100 may be present on the worksite. For example, if the first signal of the estimated position of the machine 100 indicates that the machine 100 is located at certain coordinates (say "Y") within the worksite with an uncertainty of "X" meters. This is indicative that the machine 100 may be located within X meters of coordinates of Y. In one embodiment, each of the first and second localization modules 206, 210 may generate signals indicative of a health flag associated with the respective first and second localization modules 206, 210. The health flag may have value indicative of whether the respective first and/or second localization module 206, 210 is faulty or not.

A position determination module 212 is communicably coupled to the first and second localization modules 206, 210. The position determination module 212 is configured to receive the first and second position estimate signals from the first and second localization modules 206, 210 respectively.

Further, the position determination module 212 may receive the health flag signals and/or the errors associated with the first position estimate signal and the second position estimate signal respectively.

The position determination module 212 is configured to determine a health of the first localization module 206 and the second localization module 210 based on the received signals. For example, the position determination module 212 may determine if any one of the first or second localization module 206, 210 is unhealthy or faulty. The fault associated with the first or second localization module 206, 210 may in turn be indicative of a fault in the respective first or second IMU 204, 208. Accordingly, the position determination module 212 may determine the fault associated with the first or second IMU 204, 208 based on the health of the corresponding first and second localization modules 206, 210.

The health of the first and second localization modules 206, 210 may be determined by the position determination module 212 in a number of ways. In one case, based on the health flag signal issued by the respective first and second localization modules 206, 210, the health may be determined. For example, if the first localization module 206 issues the health flag signal indicating that the first localization module 206 is unhealthy, the position determination module 212 may determine the fault associated with the first IMU 204 coupled to the first localization module 206.

In another case, based on the uncertainty associated with the first and second position estimate signals respectively, the position determination module 212 may determine the associated fault with the first or second localization module 206, 210 and the corresponding first or second IMU 204, 208. For example, if a relatively large degree of uncertainty is associated with any one of the first or second position estimate signal, the position determination module 212 may identify the fault associated with the corresponding first or second localization module 206, 210. In another example, if the uncertainty exceeds a predetermined threshold, the position determination module 212 may identify the fault with the corresponding first or second localization module 206, 210.

Further, the position determination module 212 may determine an estimated position of the machine 100 based on the determined health of the first and second localization modules 206, 210. In a situation wherein the fault is determined in association with any one of the first or second localization module 206, 210, the position determination module 212 may filter out or discard either the first position estimate signal or the second position estimate signal based on the determination of the fault. For example, if the fault is determined with the first localization module 206, the position determination module 212 may filter out the first position estimate signal. Further, the position determination module 212 may forward the second position estimate signal as the position of the machine 100 on the worksite.

Also, the position determination module 212 may provide an indication of the determined fault associated with the first or second localization module 206, 210. In one embodiment, a notification may be issued to personnel to provide the indication of the fault. The notification may include an audio or visual feedback indicating to the personnel that the respective first or second IMU 204, 208 is faulty.

The position determination module 212 is further configured to re-initialize any one of the first or second localization module 206, 210 based on detection of the fault. One of ordinary skill in the art will appreciate that the fault associated with the first or second IMUs 204, 208 may either be intermediate or permanent. During the intermediate failure of the first or second IMU 204, 208 the corresponding first or second localization module 206, 210 may also fail. In such a case, the position determination module 212 may reset or re-initialize the failed first or second localization module 206, 210, as the case may be. In a situation wherein the fault in the first or second IMU 204, 208 is permanent and new IMU is installed on the system to replace the faulty IMU, the new IMU may be reset based on the healthy first or second IMU 204, 208 present onboard the machine 100. Accordingly, the position determination module 212 may facilitate in the re-initialization of the faulty IMU or the new IMU without user intervention.

In another situation, when no fault is determined either with the first localization module 206 or the second localization module 210, the position determination module 212 may combine the first and second position estimate signals to generate the position of the machine 100. For example, the position of the machine 100 may be a weighted average of the first and second position estimate signals. Alternatively, any other method of combining the first and second position estimate signals may be utilized.

The position determination module 212 may embody a single microprocessor or multiple microprocessors that includes a means for receiving signals from the first and second localization modules 206, 210. Numerous commercially available microprocessors may be configured to perform the functions of the position determination module 212. It should be appreciated that the position determination module 212 may readily embody a general machine microprocessor capable of controlling numerous machine functions. A person of ordinary skill in the art will appreciate that the position determination module 212 may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

The single PBL system is employed on the machine to allow the position of the machine on the worksite to be estimated at locations on the worksite at which GPS operation is denied. The single PBL system on board the machine includes an inertial measurement unit (IMU), one or more perception sensors, a position estimation filter and other sensors. The IMU sensor may be utilized to propagate position changes of the machine and the perception sensor may be utilized to provide a correction to the position change for achieving better accuracy.

Errors present in the position change signal of the IMU may be corrected based on the signals provided by the perception sensor. However, in some situations, large or long term errors provided by the IMU may degrade an overall performance of the PBL system. On some machines, multiple IMUs may be connected to the single PBL system to provide more reliable system architecture. However, in this case, it may become difficult to ascertain which IMU is faulty.

The present disclosure relates to a system that provides the first and second localization modules 206, 210 and the associated first and second IMUs 204, 208 respectively, each of the first and second localization modules 206, 210 communicably coupled to the position determination module 212. The position determination module 212 may receive the signals from the first and second localization modules 206, 210 and accordingly determine the health of the corresponding first and second IMUs 204, 208. The system 200 may provide a robust structure in which the health of the first and second IMUs 204, 208 may be determined without adding any additional hardware to the system 200. Further, the position determination module 212 is configured to re-initialize the faulty IMU or the new IMU installed on the system, based on the signals received from the other healthy IMU with no user intervention.

Figure 3:
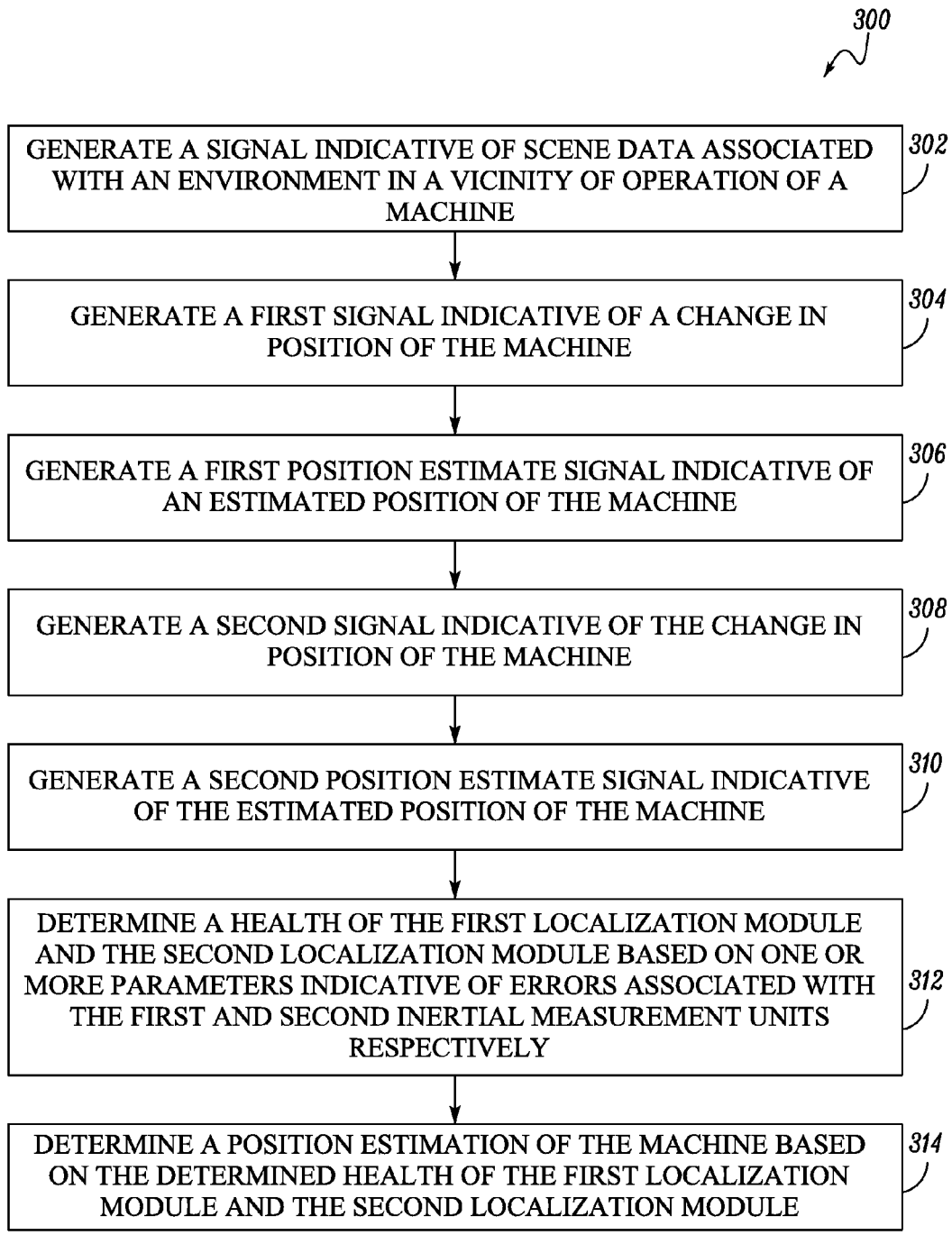
FIG. 3 is a flowchart of a method for estimating the position of the machine.

FIG. 3 illustrates a method 300 for detecting the position of the machine 100 on the worksite. At step 302, the perception sensor 202 may generate the signal indicative of the scene data associated with the environment in which the machine 100 operates. At step 304, the first IMU 204 may generate the signal indicative of the change in the position of the machine 100. At step 306, the first localization module 206 may generate the first position estimate signal based on inputs received from the perception sensor 202 and the first IMU 204. At step 308, the second IMU 208 may generate the signal indicative of the change in the position of the machine 100. At step 310, the second localization module 210 may generate the second position estimate signal based on the signals received from the perception sensor 202 and the second IMU 208. At step 312, the position determination module 212 may determine the health of the first and second localization modules 206, 210 based on the signals received from the first and second localization modules 206, 210 respectively.

As described earlier, if the first or second localization module 206, 210 is determined to be faulty, then the corresponding first or second IMU 204, 208 is determined to be faulty. At step 314, the position determination module 212 may determine the estimated position of the machine 100 based on the determined health of the first and second localization modules 206, 210. In one embodiment, if any one of the first or second localization module 206, 210 is determined to be faulty, then the position determination module 212 may filter out the position estimate signal associated with the faulty localization module and forward the other position estimate signal. In another situation, the estimated position of the machine 100 may be based on the combination of the first and second position estimate signals, if both the first and second localization modules 206, 210 are determined to be healthy. In one embodiment, the position determination module 212 may re-initialize the faulty or the new IMU based on the signals received from the healthy IMU.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
a perception sensor configured to generate a signal indicative of scene data associated with an environment in a vicinity of operation of a machine;
a first inertial measurement unit configured to generate a first signal indicative of a change in position of the machine;
a first localization module communicably coupled to the perception sensor and the first inertial measurement unit, the first localization module configured to generate a first position estimate signal indicative of an estimated position of the machine;
a second inertial measurement unit configured to generate a second signal indicative of the change in position of the machine;
a second localization module communicably coupled to the perception sensor and the second inertial measurement unit, the second localization module configured to generate a second position estimate signal indicative of the estimated position of the machine; and
a position determination module communicably coupled to the first localization module and the second localization module, the position determination module configured to:
determine a health of the first localization module and the second localization module based on one or more parameters indicative of errors associated with the first and second inertial measurement units respectively; and
determine an estimated position of the machine based on the determined health of the first localization module and the second localization module.

2. The system of claim 1, wherein the one or more parameters includes at least one of a health flag and a degree of uncertainty associated with the position estimate signal.

3. The system of claim 1, wherein the position determination module is further configured to:
determine a fault associated with at least one of the first inertial measurement unit and the second inertial measurement unit.

4. The system of claim 3, wherein the position determination module is further configured to:
filter out any one of the first position estimate signal and the second position estimate signal based on the determination of the fault.

5. The system of claim 3, wherein the position determination module is further configured to:
re-initialize any one of the first inertial measurement unit and the second inertial measurement unit based on the determination of the fault.

6. The system of claim 1, wherein the first and second inertial measurement units include an accelerometer respectively.

7. The system of claim 1, wherein the perception sensor further includes at least one of a light detection and ranging (LIDAR) device, a radio detection and ranging (RADAR) device, a sound navigation and ranging (SONAR) device, and an image capturing device.

8. The system of claim 1, wherein the first and second inertial measurement units are located onboard the machine.

9. A method comprising:
generating a signal indicative of scene data associated with an environment in a vicinity of operation of a machine;
generating a first signal indicative of a change in position of the machine;
generating a first position estimate signal indicative of an estimated position of the machine;
generating a second signal indicative of the change in position of the machine;
generating a second position estimate signal indicative of the estimated position of the machine;
determining a health of a first localization module and a second localization module based on one or more parameters indicative of errors associated with a first and a second inertial measurement units respectively; and
determining an estimated position of the machine based on the determined health of the first localization module and the second localization module.

10. The method of claim 9, wherein the one or more parameters includes at least one of a health flag and a degree of uncertainty associated with the position estimate signal.

11. The method of claim 9 further comprising:
determining a fault associated with at least one of the first inertial measurement unit and the second inertial measurement unit.

12. The method of claim 11 further comprising:
filtering out any one of the first position estimate signal and the second position estimate signal based on the determination of the fault.

13. The method of claim 11 further comprising:
re-initializing any one of the first inertial measurement unit and the second inertial measurement unit based on the determination of the fault.

14. A machine operating on a worksite, the machine comprising:
a power source;
a frame;
a perception sensor configured to generate a signal indicative of scene data associated with an environment in a vicinity of operation of the machine;
a first inertial measurement unit configured to generate a first signal indicative of a change in position of the machine;
a first localization module communicably coupled to the perception sensor and the first inertial measurement unit, the first localization module configured to generate a first position estimate signal indicative of an estimated position of the machine;
a second inertial measurement unit configured to generate a second signal indicative of the change in position of the machine;
a second localization module communicably coupled to the perception sensor and the second inertial measurement unit, the second localization module configured to generate a second position estimate signal indicative of the estimated position of the machine; and
a position determination module communicably coupled to the first localization module and the second localization module, the position determination module configured to:
   determine a health of the first localization module and the second localization module based on one or more parameters indicative of errors associated with the first and second inertial measurement units respectively; and
   determine an estimated position of the machine based on the determined health of the first localization module and the second localization module.

15. The machine of claim 14, wherein the one or more parameters includes at least one of a health flag and a degree of uncertainty associated with the position estimate signal.

16. The machine of claim 14, wherein the position determination module is further configured to:
determine a fault associated with at least one of the first inertial measurement unit and the second inertial measurement unit.

17. The machine of claim 16, wherein the position determination module is further configured to:
filter out any one of the first position estimate signal and the second position estimate signal based on the determination of the fault.

18. The machine of claim 16, wherein the position determination module is further configured to:
re-initialize any one of the first inertial measurement unit and the second inertial measurement unit based on the determination of the fault.

19. The machine of claim 14, wherein the first and second inertial measurement units include an accelerometer respectively.

20. The machine of claim 14, wherein the perception sensor further includes at least one of a light detection and ranging (LIDAR) device, a radio detection and ranging (RADAR) device, a sound navigation and ranging (SONAR) device, and an image capturing device.

* * * * *